Patented Aug. 27, 1929.

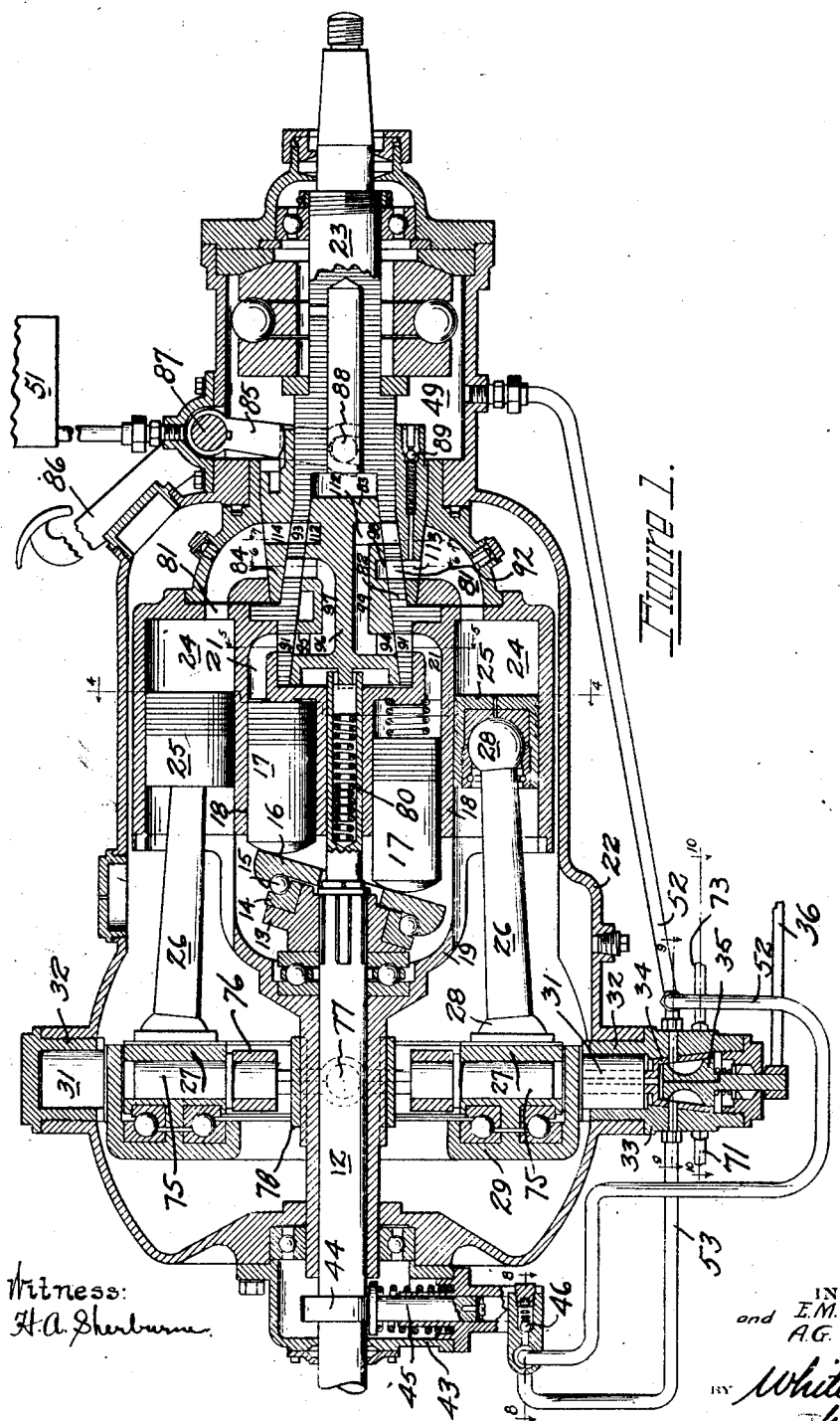

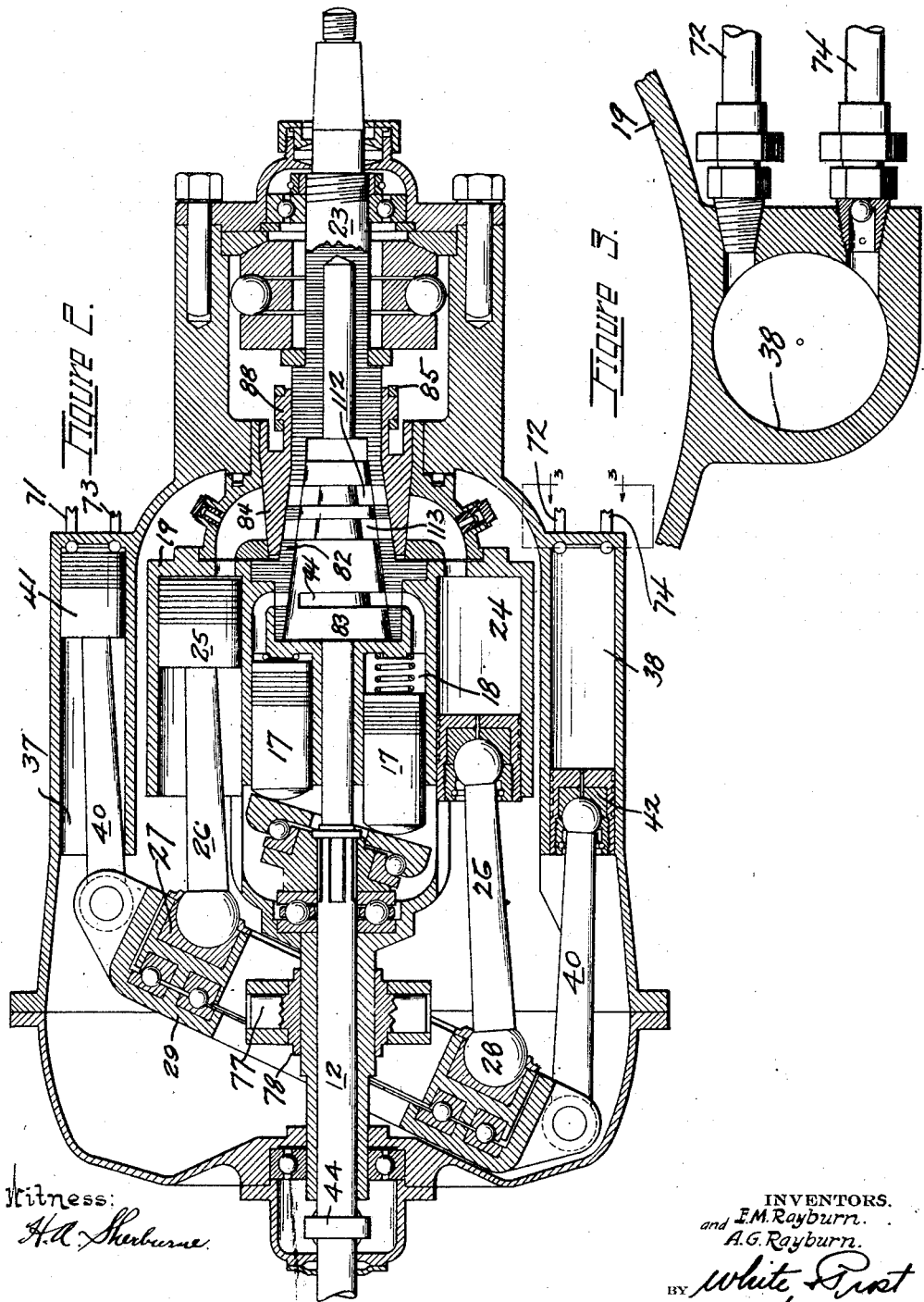

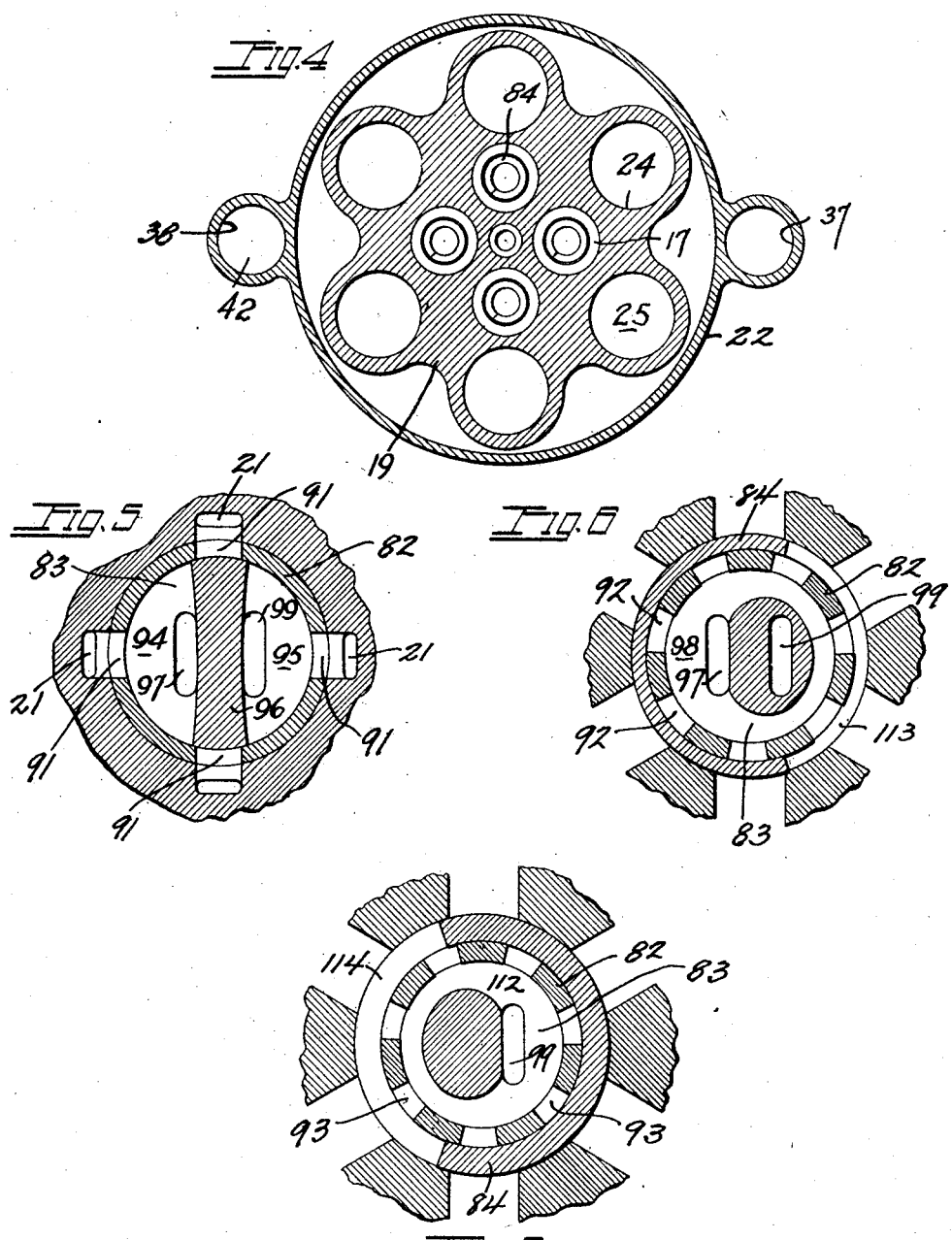

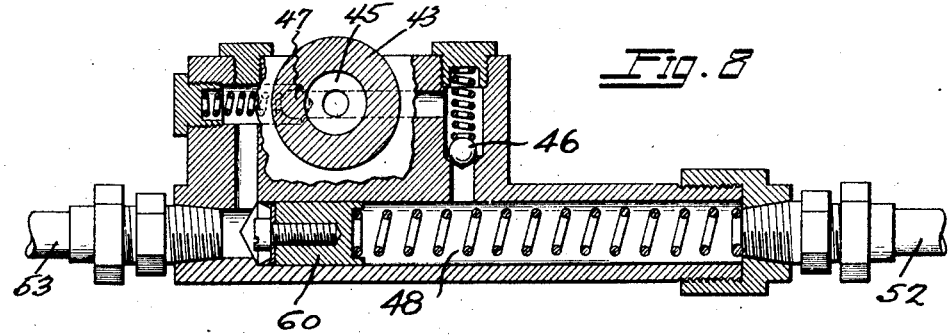
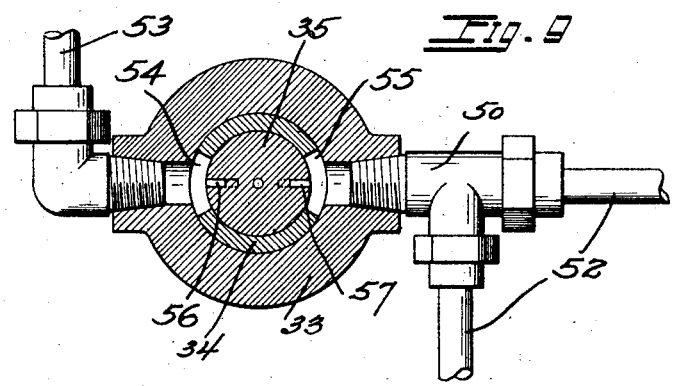
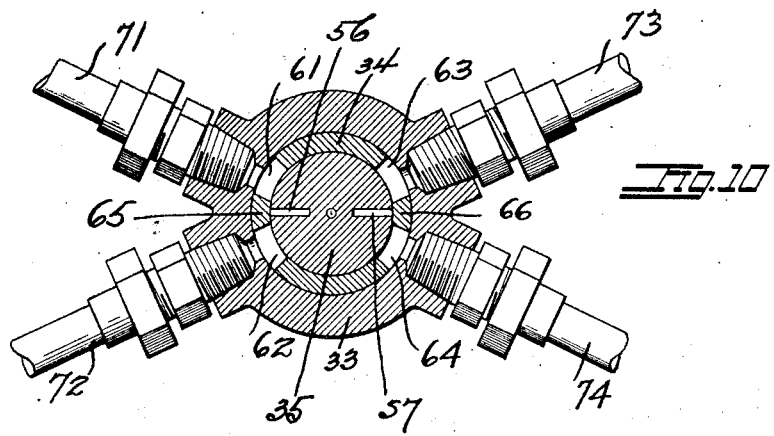

1,726,454

UNITED STATES PATENT OFFICE.

ELWYN M. RAYBURN AND ALDEN G. RAYBURN, OF SAUSALITO, CALIFORNIA, ASSIGNORS, BY DIRECT AND MESNE ASSIGNMENTS, OF ELEVEN AND ONE-HALF PER CENT TO SAID ELWYN M. RAYBURN, ELEVEN AND ONE-HALF PER CENT TO SAID ALDEN G. RAYBURN, ELEVEN AND ONE-HALF PER CENT TO EDDY S. RAYBURN, OF SAUSALITO, CALIFORNIA; FOURTEEN AND ONE-HALF PER CENT TO JAMES WAYNE SUMNER, AND FIFTY-ONE PER CENT TO EMORY WINSHIP, BOTH OF SAN FRANCISCO, CALIFORNIA.

POWER-TRANSMISSION APPARATUS.

Application filed December 31, 1919, Serial No. 348,589. Renewed June 21, 1927.

The invention relates to variable speed power transmission apparatus for transmitting power from a driving element to a driven element and particularly to an apparatus employing a fluid as the power transmitting medium.

An object of the invention is to provide a variable speed power transmission apparatus of the fluid or hydraulic type which is highly efficient in operation.

Another object of the invention is to provide improved means for varying the speed ratio of the apparatus.

A further object of the invention is to provide hydraulically operated means for varying the speed ratio of the apparatus.

Another object of the invention is to provide a fluid type variable speed transmission apparatus in which the resistance opposed to the movement of the fluid is employed to do useful work.

The invention possesses other advantageous features, some of which, with the foregoing, will be set forth at length in the following description, where we shall outline in full, that form of the invention which we have selected for illustration in the drawings accompanying and forming part of the present specification. In said drawings we have shown one specific form of the transmission apparatus of our invention, but it is to be understood that we do not limit ourselves to such form, since the invention, as expressed in the claims, may be embodied in a plurality of forms. In said drawings, we have shown the transmission embodied in a form which is particularly adapted for use in automobiles and other power propelled vehicles and while such use is large, the transmission is clearly adaptable for use in other environment.

Referring to said drawings:

Figure 1 is a vertical longitudinal section through the apparatus of our invention arranged for installation in an automobile.

Figure 2 is a horizontal longitudinal section through the apparatus.

Figure 3 is a section taken on the line 3—3, Figure 2.

Figure 4 is a section taken on the line 4—4, Figure 1.

Figure 5 is a section taken on the line 5—5, Figure 1.

Figure 6 is a section taken on the line 6—6, Figure 1.

Figure 7 is a section taken on the line 7—7, Figure 1.

Figure 8 is a section taken on the line 8—8, Figure 1.

Figure 9 is a section taken on the line 9—9, Figure 1.

Figure 10 is a section taken on the line 10—10, Figure 1.

The apparatus comprises a driving element adapted to be connected to the crank shaft of the engine and a driven element, flexibly connected thereto by a fluid medium, which is adapted to be secured to the propeller shaft of the vehicle. The flexibility of the connection between the driving and driven elements may be varied at will, to vary the ratio of the speeds of the two elements, and power operated means are provided for actuating the parts to produce the speed ratio variation.

The driving element comprises the shaft 12 which is connected to the engine or other prime mover. Secured to the shaft 12 is a head 13 having an annular face 14 disposed at an angle to the axis of the shaft. Mounted on this head 13, by a suitable anti-friction bearing 15 is an annular plate 16, the face of which is similarly inclined to the axis of the shaft, so that as the shaft rotates, the plate 16 is oscillated. Bearing against the inclined face of the plate 16 are a plurality of spring-pressed pistons 17, in this instance there being four pistons. The pistons are reciprocable in cylinders 18 formed in the body 19 and each cylinder is provided with a port 21, which serves as the inlet and outlet passage of the cylinders. These pistons operate to pump liquid, preferably oil, and will hereinafter be referred to as the pump pistons.

The body 19 is suitably journaled in the stationary housing 22, which is suitably supported in the vehicle, and the driven shaft 23 is secured to the body. Formed in the body are a plurality of cylinders 24, in the present instance there being six of such cylinders to and from which the oil from the pump cylinders flows. The cylinders 24, like the cylinders 18, are regularly spaced apart circumferentially and the cylinders 24 surround the cylinders 18. Disposed in the cylinders 24 are pistons 25 which are connected by the piston rods 26 to the rotatable ring 27. The piston rods are provided on both ends with ball heads 28 and the pistons 25 and ring 27 are provided with suitable sockets for receiving these heads. The ring 27 is rotatably mounted in the circular housing 29, which is provided at the top and bottom with diametrically opposed trunnions 31 engaging in bearings 32 in the stationary housing 22. The circular housing 29 is angularly adjustable, so that the stroke of the pistons 25 may be varied.

Hydraulically operated means are provided for moving and holding the housing 29 in adjusted position. Secured to the lower bearing 32 is a valve body 33, preferably of conical interior form, in which there is disposed an annular conical valve seat 34 which is secured to the lower trunnion 31 so that it rotates with the trunnion as the housing is rotated. Seated in the seat 34 is a conical valve plug 35 which is rotatable by any suitable means, such as the lever 36, which is suitably connected to a lever arranged conveniently to the driver of the vehicle. By moving the lever 36, the flow of liquid under pressure is controlled to produce a variation in the angular position of the housing 29.

Formed in the stationary housing 22, preferably at the sides thereof, are cylinders 37—38 in which are disposed pistons 41—42, which are connected to the circular housing 29 at diametrically opposite points, midway between the trunnions, by piston rods 40. Movement of the pistons in opposite directions serves to vary the inclination of the circular housing with respect to the axis of the driving shaft.

Fluid, preferably oil, under pressure, the flow of which is controlled by the valve 35, is employed for moving the pistons 41—42 in the cylinders. The oil is placed under pressure by the pump 43, which is driven from the driving shaft 12. Secured to, or formed integral with the driving shaft, is a cam 44, against which the spring pressed plunger 45 of the oil pump bears and by which it is reciprocated. The oil pump is provided with spring-pressed inlet and outlet valves 46 and 47. The inlet and outlet conduits of the valve are connected by a by-pass conduit 48 in which a spring-pressed plunger 60 is disposed, which plunger normally closes the conduit 48 between the inlet and outlet conduits. An increase in pressure on the outlet side of the pump, to a predetermined pressure, moves the plunger backward to uncover the inlet port and thereby open the by-pass conduit between the inlet and outlet sides of the pump.

The oil which is placed under pressure by the pump is preferably drawn from the closed chamber 49 formed in the rear part of the stationary housing 22. This chamber is kept filled with oil from the supply tank 51, disposed above the chamber. From the chamber 49 the oil flows through the conduit 52 to the inlet side of the pump 43, a branch connection 50 being made with the valve body 33, for reasons which will hereinafter become apparent. From the pump, the oil under high pressure flows through the conduit 53, to the valve body 33. In the plane of the inlet of the conduit 53 in the valve body, the valve seat 34 is provided with diametrically opposed apertures 54 and 55, which normally register with the conduits 53 and 50 respectively. The valve plug 35 is provided with two diametrically opposed axially extending grooves 56—57 which normally register with the apertures 54 and 55 respectively. The grooves 56 and 57 extend downwardly below the lower edges of the apertures 54 and 55. Below the plane of the conduits 52—53 the valve seat 34 is provided with two pairs of diametrically disposed apertures 61—62 and 63—64. The pair of apertures 61—62 are separated by a bridge 65 of greater width than the groove 56 and the pair of apertures 63—64 are separated by a bridge 66, of greater width than the groove 57.

Connected to the valve body in the plane of the apertures 61—62—63—64, and opening on the inner face of the valve body, in normal registry with the four apertures, respectively, are four conduits 71—72—73—74. The conduits 71 and 72 we have termed the high pressure conduits and the conduits 73—74 we have termed the low pressure conduits. The conduits 71 and 73 are connected to the end of cylinder 37 and the conduits 72 and 74 are connected to the end of cylinder 38.

When it is desired to vary the inclination of the circular housing 29, the lever 36 is moved in the desired direction to change the setting of the valve plug 35. Assume the valve parts to be in the positions indicated in Figures 9 and 10, which are the normal positions of the parts, and assume the lever 36 moved slightly in a counterclockwise direction, to bring the grooves 56 and 57 into registry with the apertures 62 and 63 respectively. Oil under pressure from the pump then flows through the groove 56 and the conduit 72 into the cylinder 38, moving the piston therein to change the setting of the ring housing 29 and consequently forcing oil from cylinder 37, through the conduit 73, aperture 63 and groove 57, to the low pressure connection 50. The movement of the housing 29 causes a similar and synchronous rotation of the valve seat 34, bringing the bridges 65 and 66 over the lower ends of the grooves 56 and 57 and stopping the flow of oil and the movement of the ring housing, as soon as the housing has moved through the angle through which the control lever was moved. The inclination of the ring housing, which controls the speed ratio of the driving and driven shafts, is therefore produced gradually so that no undue strains are placed on the prime mover and the variation of the inclination is automatic and does not depend upon the rate of movement of the control lever by the operator.

The ring 27 is connected to the body 19, to which the driven shaft is secured, so that power developed by the reciprocation of the pistons 25 in the cylinders 24 is delivered to the driven shaft and so that the ring rotates synchronously with the driven shaft. The ring is provided with two diametrically opposed sockets in which the pins 75 seat. The outer ends of the pins 75 seat in sockets in a gimbal ring 76 which is also provided with two other diametrically opposed sockets, disposed at 90° from the first sockets and in which the pins 77 on the collar 78 seat. The collar is keyed to the cylinder block 19 and the pins 77 are disposed at right angles to the pins 75, so that a gimbal joint is formed which permits variation in inclination of the ring housing 29.

The cylinders are filled with a fluid, preferably oil, which is forced from one cylinder to the other as the driving element rotates with respect to the driven element. With the driven element stationary, rotation of the driving element causes the plate 16 to reciprocate the pistons 17, pumping oil from the cylinders 18, which we have termed the pump cylinders. Should a resistance be opposed to the flow of oil from the pump cylinders, the driven element would be caused to rotate, substantially in direct proportion to the resistance offered. The oil is pumped from the cylinders 18 into the cylinders 24 and the pressure of the oil drives the pistons 25 and consequently the ring 27 which is connected to the driven shaft, thereby supplying power to the driven shaft. The resistance offered to the flow of the oil is therefore converted into energy and delivered to the driven shaft, so that only the energy consumed to overcome the frictional resistance to the passage of the oil through the conducting passages is lost, and by making the passages of proper size this lost energy is reduced to a minimum. The cylinders 24 have been termed the motor cylinders.

Each pump cylinder is provided with an inlet and outlet port 21 and each motor cylinder is provided with an inlet and outlet port 81, and means are provided for controlling the flow of oil to and from the various cylinders. The driven shaft 23 is provided on its end with a flaring conical valve seat 82 which is secured to and rotatable with the cylinder block 19 and the valve seat 82 is provided with oil ports and passages, as will hereafter be described. Seated in the valve seat is a conical valve 83, secured to the driving shaft 12 so that it rotates therewith and held tightly to its seat by the spring 80 disposed in the driving shaft. Since the positions of the pump pistons are determined by their relative positions with respect to the inclined plate 16 and the position of the valve 83 is fixed with relation to the plate, the valve opens and closes the ports 21 at the proper times with relation to the movements of the pump pistons.

Surrounding and engaging the conical valve seat 82 is a non-rotatable valve 84 which controls the flow of oil to and from the motor cylinders 24. The valve 84 is held against rotation by the lever 85, which engages in a longitudinal slot in the valve. The valve 84 is movable longitudinally to unseat it from the seat 82, to establish direct connection between the four cylinders 18, thereby permitting the pistons 17 to reciprocate without opposition and thus interrupting the driving connection between the driving and driven shafts. The valve member 84, other than acting as a valve to control the flow of oil between cylinders 18 and 24, serves also as a clutch to quickly connect or disconnect the driving and driven shafts. The valve 84 is shifted longitudinally by the foot lever 86, secured to the shaft 87 of the lever 85. The lever is provided with a bifurcated end having slots therein engaging pins 88 on opposite sides of the valve. Depression of the foot lever unseats the valve and a suitable spring, not shown, is employed for returning the foot lever to raised position, when pressure thereon is released. The valve 84 is also provided with a conduit having a check valve 89 therein, to permit oil to flow from the chamber 49 into the cylinder oil passage, when the supply therein becomes deficient.

The rotatable and stationary valve members 83 and 84 and the valve seat 82 are provided with passages and conduits through which the oil flows from the pump cylinders to the motor cylinders, and vice versa, and these passags and conduits are so shaped and proportioned to produce the proper distribution of the oil. The valve seat 82, which is secured to the cylinder block 19, is provided with four ports 91 which register with the oil passages 21. The valve seat is also provided with two series of circumferentially disposed apertures 92 and 93, the two series being spaced apart longitudinally and the apertures in each series, in the present instance there being seven, spaced apart regularly circumferentially.

The valve 83 is provided with two angularly spaced circumferentially disposed apertures 94 and 95, the two apertures being spaced apart circumferentially a distance slightly greater than the width of an aperture 91 in the valve seat. In the plane of the apertures 94—95, and separating the two apertures, is a wall 96. Formed in the valve and communicating with the aperture 94 is a passage 97, extending longitudinally of the valve and opening into a circumferential groove 98 which lies in the plane of the apertures 92, and a passage 99 communicating with the aperture 94 and extending longitudinally of the valve into a circumferential groove 112 which lies in the plane of the apertures 93. The stationary valve 84 is provided with a circumferentially disposed aperture 113, of less than 180° arc, which establishes communication between the passages 81 and the groove 98 and with a circumferentially disposed aperture 114, of less than 180° arc, which establishes connection between the passages 81 and the groove 112. The apertures 113 and 114 in the stationary valve are diametrically opposed and arranged in different planes.

In operation, assuming the parts to be in the position shown in Figure 1, oil is pumped from the lower cylinder 18 through the passage 21, apertures 91 and 94, through the passage 99 to the groove 112, which it passes around, thence through the apertures 93 and 114 into the passage 81 and into the upper cylinder 24, driving the piston therein forward. This drives the piston in the lower cylinder 24 backward, forcing the oil under low pressure, through the passage 81, apertures 113 and 92 to the groove 98, around the groove 98, through the passage 97, through the apertures 95 and 91 into the passage 21 of the upper cylinder 18. The ports and apertures are so positioned that relative rotation of the driving and driven elements bring them into registry at the proper time to cause the desired flow of the oil to and from the proper cylinders. With the housing 29 moved to its position of maximum inclination, substantially no resistance is offered to the flow of the oil, so that the pistons 17 may reciprocate freely and the movement of the plate 16 is not resisted, so that no rotary motion is imparted to the cylinder block. As the ring housing 29 is moved from its position of maximum inclination, the capacity of the cylinders 24 for oil is decreased, consequently a less amount of oil may be pumped by the pump cylinders and the cylinder block must rotate with respect to the driving shaft. The relative rotation of the cylinder block with respect to the driven shaft varies with the inclination of the ring housing, and when the ring housing is moved to a plane normal to the axis of the driving shaft, the pistons 25 do not move in their cylinders, the pistons 17 are held against movement and the driving and driven shafts rotate in synchronism. Backward longitudinal movement of the valve member 84 uncovers and establishes communication between grooves 92 and 93, so that oil may flow freely between the pump cylinders thereby removing all resistance and permitting driving shaft to rotate freely without rotating driven shaft.

We claim:

1. A torque multiplying variable speed transmission comprising a driven shaft; a driving shaft; a variable capacity fluid motor embodying a plurality of parallel rotatable cylinders connected to said driven shaft; a fluid pump actuated by said driving shaft and delivering actuating fluid to said motor comprising a plurality of parallel cylinders within and driven by said motor; fluid ports in one end of said motor cylinders; fluid ports in the ends of said pump cylinders adjacent the port ends of said motor cylinders; and a valve mechanism disposed adjacent the port ends of said cylinders comprising stationary high and low pressure fluid passages with which said pump ports communicate through 360 degrees of revolution thereof.

2. The combination as set forth in claim 1 in which said valve mechanism comprises means for interconnecting said high pressure and low pressure fluid passages.

3. A torque multiplying power transmission comprising a driving member; a driven member; a pump including a plurality of pump cylinders having pistons therein; said pump being actuated by said driving member; a motor including a plurality of motor cylinders having pistons therein; said pump cylinders and said motor cylinders connected to said driven member and with one group of cylinders surrounding the other; a valve member connected to said driving member, and having ports communicable with said pump cylinders and other ports communicable with said motor cylinders, directing the flow of fluid between said pump cylinders and said motor cylinders.

4. A torque multiplying transmission apparatus comprising a driving member, a driven member, a pump actuated by the difference of rotation of said driving and said driven members; a motor driving said driven member; a valve member driven by said driving member having ports communicable with said pump and other ports being communicable with said motor; a stationary ported valve member coacting with said first mentioned valve member to direct the flow of fluid between said pump and said motor; and an external source of fluid supply; said stationary valve member including means permitting flow of fluid from said source into the low pressure side of the fluid system.

5. The combination as set forth in claim 4, together with means for establishing a fluid by-pass between said pump and said motor.

6. A torque multiplying power transmission comprising a driving member; a driven member; a pump including a plurality of pump cylinders having pistons therein; actuating means for said pump driven by said driving member; a motor including a plurality of motor cylinders having pistons therein; supporting means for said motor cylinders surrounding said pump actuating means; said pump cylinders and said motor cylinders being connected to said driven member; a valve member connected to said driving member having ports communicable with said pump cylinders; and other ports communicable with said motor cylinders; and a stationary valve member engaging and surrounding said first mentioned valve member to direct the flow of fluid between said pump cylinders and said motor cylinders.

7. The combination as set forth in claim 6, together with means for establishing a fluid by-pass between said pump cylinders and said motor cylinders.

8. A transmission apparatus comprising a driving member; a driven member; a fluid pump element on the driving member; an annular fluid motor connected to the driven member; a complemental pump element surrounded by and rotatable with said motor; and fluid passages including a central valve for distributing the fluid between the pump elements and the motor.

9. The combination as set forth in claim 8 in which one pump element includes cylinders having pistons therein; the other pump element including means for causing relative reciprocation between each piston and its respective cylinder.

10. The combination set forth in claim 8 in which one pump element includes cylinders having pistons therein, the other pump element including means for causing relative reciprocation between each piston and its respective cylinder, said motor including cylinders having pistons reciprocable therein, and means for varying the stroke of said motor pistons.

11. A transmission apparatus embodying a driving member, a driven member, a fluid motor connected to said driven member and formed with a central recess, a fluid pump within said recess and comprising complemental elements coacting to generate pressure in a fluid, one of said elements rotating with the motor and the other being driven by the driving member, and means including a central valve for distributing the fluid between said pump and said motor.

12. The combination as set forth in claim 11 in which the means includes a central valve plug rotatable with the driving member and a stationary annular member surrounding said plug, said annular member and plug having fluid distributing passages formed therein.

13. In a fluid transmission, the combination of a cylinder barrel having two concentric annularly arranged series of axially disposed cylinder bores provided with ports at one end, pistons movable in said cylinder bores to displace fluid therein, a rotatable driving member, cam means on said driving member engaging the pistons of one series for reciprocating them during relative rotation of the cylinder barrel and driving member, non-rotatable cam means operatively connected to the pistons of the other series, a driven member secured to the cylinder barrel, and central valve means adjacent said ports for distributing the fluid between the two series of cylinder bores.

14. A torque multiplying variable speed transmission comprising a variable capacity fluid motor embodying a plurality of rotatable cylinders; a driven shaft connected to and driven by said motor, a driving shaft, a fluid pump actuated by said driving shaft and including a plurality of cylinders surrounded by and rotatable with said motor cylinders, said pump delivering actuating fluid to said motor in direct proportion to the amount of torque multiplication; said pump cylinders and said motor cylinders having fluid ports formed in the adjacent ends thereof, and a valve mechanism disposed adjacent the port ends of said cylinders for distributing the fluid between the pump cylinders and motor cylinders and including stationary high and low pressure fluid passages with which said pump ports communicate through 360° of revolution thereof.

15. The combination as set forth in claim 14 in which the valve mechanism includes a valve element in which said passages are formed, said valve element being stationary during normal operation of the transmission, and means for moving said valve element axially to inoperative position for permitting the free by-pass of fluid between the cylinders.

16. A hydraulic torque multiplying transmission comprising a driving member, a driven member, a fluid pump having cylinders connected to said driven member, actuating means for said pump driven by said driving member, a fluid motor actuating said driven member comprising a plurality of cylinders, supporting means for said motor cylinders surrounding said pump actuating means, and fluid distributing means between said pump and said motor.

17. A hydraulic transmission comprising a driving member, a driven member, a pump actuated by the difference in rotation of said driving and said driven member, a motor surrounding said pump, said motor actuated by fluid delivered thereto by said pump and driving said driven member, and a fluid distributing valve between said pump and said motor comprising a member driven by said driving member, an annular member driven by said driven member, and an annular stationary member.

18. A hydraulic transmission comprising a driving member, a driven member, a pump actuated by the difference in rotation of said driving and said driven members, a variable capacity motor surrounding said pump and driving said driven member, means for varying the volumetric capacity of said motor, manually controlled means for initiating and predetermining the extent of movement of said first mentioned means, and means controlled by said first mentioned means for arresting the operation thereof at the end of said predetermined movement of said first mentioned means.

19. A hydraulic transmission comprising a driving member, a driven member, a fluid pump actuated by the difference in rotation of said driving and said driven members, a variable capacity fluid motor driving said driven member and actuated by fluid delivered thereto by said pump, fluid pressure operated means for varying the capacity of said motor, means actuated by said driving member for delivering actuating fluid under pressure to said first mentioned means, a manually operated valve for initiating operation of said first mentioned means and for predetermining the extent of operation thereof, and means controlled by said first mentioned means for arresting the operation of said first mentioned means when the operation predetermined by said valve has been effected.

20. A hydraulic transmission comprising a driving member, a driven member, a pump actuated by the difference in rotation of said members comprising actuating means driven in a circular path by said driving member, a fluid motor actuating said driven member comprising stationary reacting means having a circular reacting pathway for said motor adjacent to and larger in diameter than said first mentioned circular path and valve mechanism controlling the flow of fluid between said pump and said motor.

21. A torque multiplying transmission comprising driving and driven members; a fluid pump actuated to pump fluid by the difference in rotation of said members; a variable capacity motor driving said driven member; rotatable fluid distributing means having ports communicable with said pump and motor; stationary ported fluid distributing means co-acting with said rotatable distributing means to complete a fluid circulating system between said pump and motor; a stationary fluid supply chamber, and a fluid passage in said stationary means establishing communication between said chamber and the low pressure side of said fluid system.

22. The combination as set forth in claim 21 in which said stationary fluid supply chamber is disposed above the inlet to the low pressure side of the fluid system and feeds fluid pressure thereto by gravity.

In testimony whereof, we have hereunto set our hands at San Francisco, California, this 17th day of December 1919.

ELWYN M. RAYBURN.
ALDEN G. RAYBURN.